United States Patent
Creux et al.

(10) Patent No.: US 7,449,243 B1
(45) Date of Patent: Nov. 11, 2008

(54) GLASS YARNS, COMPOSITE THEREOF, METHOD FOR MAKING SAME AND REINFORCING GLASS COMPOSITION

(75) Inventors: Sophie Creux, La Motte Servolex (FR); Michel Leclercq, La Motte Servolex (FR); Pascal Fournier, Chambery (FR)

(73) Assignee: Vetrotex France S.A., Chambery (FR)

( * ) Notice: Subject to any disclaimer, the term of this patent is extended or adjusted under 35 U.S.C. 154(b) by 821 days.

(21) Appl. No.: 10/129,265

(22) PCT Filed: Oct. 31, 2000

(86) PCT No.: PCT/FR00/03038

§ 371 (c)(1), (2), (4) Date: Sep. 30, 2002

(87) PCT Pub. No.: WO01/32576

PCT Pub. Date: May 10, 2001

(30) Foreign Application Priority Data

Nov. 4, 1999 (FR) .................................. 99 13836

(51) Int. Cl.
  *B32B 17/06* (2006.01)
  *C03C 13/00* (2006.01)
  *B29C 53/00* (2006.01)

(52) U.S. Cl. .................. 428/426; 428/36.3; 501/35; 501/55; 501/68; 501/155; 264/13; 264/164; 65/126

(58) Field of Classification Search .......... 428/426, 428/36.3; 501/35, 55, 68, 155, 65; 264/13, 264/164; 65/126, 376
See application file for complete search history.

(56) References Cited

U.S. PATENT DOCUMENTS

| | | | | |
|---|---|---|---|---|
| 3,095,311 A | * | 6/1963 | von Wranau et al. | 501/38 |
| 3,718,448 A | * | 2/1973 | Drummond et al. | 65/448 |
| 4,046,948 A | * | 9/1977 | Zlochower | 428/392 |
| 5,011,523 A | * | 4/1991 | Roncato et al. | 65/441 |
| 5,250,488 A | * | 10/1993 | Thelohan et al. | 501/36 |
| 5,346,864 A | * | 9/1994 | Maugendre et al. | 501/35 |
| 5,352,258 A | * | 10/1994 | DeGreve et al. | 65/474 |
| 6,136,735 A | | 10/2000 | Gallo et al. | |
| 6,199,778 B1 | * | 3/2001 | Hanvey, Jr. | 241/19 |
| 2003/0207748 A1 | * | 11/2003 | Wallenberger | 501/66 |

FOREIGN PATENT DOCUMENTS

| | | |
|---|---|---|
| FR | 2 692 248 | 12/1993 |
| GB | 1 391 384 | 4/1975 |
| JP | 57 077043 | 5/1982 |
| RU | 2 027 687 | 1/1995 |
| WO | 85 02393 | 6/1985 |
| WO | 85 02395 | 6/1985 |
| WO | 99 12858 | 3/1999 |

OTHER PUBLICATIONS

U.S. Appl. No. 10/129,265, filed Sep. 30, 2002, Creux et al.
U.S. Appl. No. 10/592,732, filed Sep. 14, 2006, Creux et al.
U.S. Appl. No. 10/592,945, filed Sep. 15, 2006, Creux et al.

* cited by examiner

*Primary Examiner*—Ling Xu
(74) *Attorney, Agent, or Firm*—Oblon, Spivak, McClelland, Maier & Neustadt, P.C.

(57) ABSTRACT

Reinforcing glass yarn, the composition of which comprises the following constituents, within the limits defined below, expressed in percentages by weight:

| | |
|---|---|
| $SiO_2$ | 54.5 to 58% |
| $Al_2O_3$ | 12 to 15.5% |
| $SiO_2 + Al_2O_3$ | 70 to 73% |
| CaO | 17 to 25% |
| MgO | 0 to 5% |
| RO = CaO + MgO | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1% | and such that the ratio $R1=Al_2O_3/CaO$ is less than 0.7, and when $SiO_2$ is greater than 57% the amount of boron oxide $B_2O_3$ is greater than 2%.

24 Claims, No Drawings

GLASS YARNS, COMPOSITE THEREOF, METHOD FOR MAKING SAME AND REINFORCING GLASS COMPOSITION

The present invention relates to "reinforcing" glass yarns (or "fibres"), that is to say those which can be used for reinforcing organic and/or inorganic materials and that can be used as textile yarns, these yarns being able to be obtained by the process which consists in mechanically drawing streams of molten glass flowing out of orifices arranged at the base of a spinneret generally heated by resistance heating.

The present invention relates more particularly to glass yarns having a particularly advantageous novel composition.

The field of reinforcing glass yarns is a very special field of the glass industry. These yarns are produced from specific glass compositions, the glass used having to be able to be drawn into the form of filaments a few micrometers in diameter using the process defined above and having to allow the formation of continuous yarns capable especially of fulfilling their reinforcement role. The reinforcing glass yarns most commonly used are thus the yarns formed from glasses which derive from the 1170° C. eutectic of the $SiO_2$—$Al_2O_3$—$CaO$ ternary diagram, particularly the yarns denoted by the name E-glass yarns, the archetype of which is described in U.S. Pat. No. 2,334,981 and U.S. Pat. No. 2,571,074. E-glass yarns have a composition essentially based on silica, alumina, lime and boric anhydride, the boric anhydride, present in amounts ranging in practice from 5 to 13% in the compositions of glasses termed "E-glass", replacing part of the silica, the E-glass yarns being furthermore characterized by a limited content of alkali metal oxides (essentially $Na_2O$ and/or $K_2O$).

Since the two aforementioned patents, glasses comprising these constituents have formed the subject of numerous modifications whose purpose is to reduce the emanations of products which might pollute the atmosphere, to reduce the cost of the composition, by decreasing the content of the most expensive constituents, to improve the ability of these glasses to undergo fiberizing (the fiberizing or forming corresponding to the operation of drawing the glass filaments from a spinneret using the above-mentioned process), especially by decreasing the viscosity at high temperatures and their tendency to devitrify, and to improve such or such a particular property.

The temperature at which the growth rate of the most refractory crystal is zero is called the "liquidus temperature", denoted by "$T_{liquidus}$". The liquidus temperature gives the upper limit of the temperature range at which the glass may have a tendency to devitrify.

Attempts have been made especially to reduce the cost of the compositions but generally to the detriment of their ability to undergo fiberizing, the use of these glasses for obtaining reinforcing yarns generally becoming more difficult or problematic, possibly requiring modifications to the existing fiberizing plants or to the operating conditions and possibly resulting in reductions in efficiency and an increase in the amount of waste obtained, finally resulting in an increase in the overall production cost. Solutions have been proposed in Applications WO 99/01393 and WO 99/12858.

The compositions corresponding to these solutions, as described in the examples in these applications, lead to relatively high characteristic temperatures.

The term "characteristic temperatures" refers to the temperature corresponding to viscosities suitable for the various steps of the process for manufacturing the glass yarns:

the temperature corresponding to a viscosity of $10^3$ poise (decipascal second) is a valuable indicator regarding the temperature about which the fiberizing is generally carried out, especially from platinum spinnerets;

the temperature corresponding to a viscosity of $10^{2.5}$ poise (decipascal second) is a valuable indicator regarding the temperature about which the conditioning of the glass is generally carried out. The term "conditioning of the glass" refers to the step which consists especially in transferring the hot glass from the furnace where the batch materials are melted and/or the products recycled via channels intended to feed the platinum spinnerets. In particular, it is desired to prevent any devitrification of the glass during this step.

The "fiberizing range" refers to the difference in temperature between the characteristic temperature corresponding to a viscosity of $10^{2.5}$ poise (decipascal second) and the liquidus temperature.

Specifically, the temperatures corresponding to a viscosity of $10^3$ poise (decipascal second) (denoted "Spinning temperature" in Table 1) are between 1255 and 1287° C. according to the examples in WO 99/01393 (Examples 1 to 4).

The temperatures corresponding to a viscosity of $10^3$ poise (decipascal second) are between 1255 and 1262° C. and the temperatures corresponding to a viscosity of $10^{2.5}$ poise (decipascal second) are between 1341 and 1351° C. according to the examples in WO 99/12858 (Examples 1 and 2).

These characteristic temperatures are higher than the characteristic temperatures of a standard E-glass by approximately 50° C. and even more.

This results in the need to maintain the glass at higher temperatures both during the conditioning of the glass and in the fiberizing device itself.

This drawback leads to an additional cost in the use of the compositions cited in the two applications mentioned, firstly due to the additional heat influx needed to condition the glass and secondly to the costs associated with having to renew the fiberizing tools more frequently, especially the platinum components, the ageing of which accelerates as the fiberizing temperature rises.

This additional cost reduces the amount of savings that are brought about by the advantageous cost of the batch materials for the compositions described in the two applications mentioned.

The development of compositions less expensive than the standard E-glass compositions and having fiberizing properties similar to those of standard E-glass still remains to be accomplished and is particularly desirable.

Thus, the subject of the present invention is glass yarns obtained from inexpensive batch materials and having an ability to undergo fiberizing which is similar to that of E-glass.

The glass yarns according to the invention are obtained from a composition essentially comprising the following constituents, within the limits defined below, expressed in percentages by weight:

| | |
|---|---|
| $SiO_2$ | 54.5 to 58% |
| $Al_2O_3$ | 12 to 15.5% |
| $SiO_2 + Al_2O_3$ | 70 to 73% |
| $CaO$ | 17 to 25% |
| $MgO$ | 0 to 5% |
| $RO = CaO + MgO$ | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1% | and such that the ratio $R1=Al_2O_3/CaO$ is less than 0.7, and when $SiO_2$ is greater than 57% the amount of boron oxide $B_2O_3$ is greater than 2%.

According to an advantageous embodiment of the invention, the constituents of the composition satisfy the criterion based on the ratio $R2=(SiO_2+Al_2O_3)/(RO+R_2O+B_2O_3)$, such that $2.35<R2<2.70$. This ratio may especially be interpreted as being the ratio of the sum of the network formers in the glass to the sum of the network modifiers.

In this regard, the ratio may be regarded as a control parameter for the viscosity of the glasses in question.

Silica is one of the oxides which forms the network of the glasses according to the invention and it plays an essential role in their stability.

The silica, $SiO_2$, content of the selected compositions is between 54.5 and 58%, especially greater than 55%, or even greater than 55.5%, and/or especially less than or equal to 57%.

In the case of compositions whose $SiO_2$ content is greater than 57%, the $B_2O_3$ content is greater than 2%.

Alumina also constitutes a network former in the glasses according to the invention and plays a very important role with regard to the resistance of these glasses. Within the framework of the limits defined according to the invention, reducing the percentage of this oxide below 12% results in an appreciable increase in the hydrolytic attack of the glass, whereas too great an increase in the percentage of this oxide results in the risk of devitrification and an increase in the viscosity.

The alumina, $Al_2O_3$, content of the selected compositions is between 12 and 15.5%, especially greater than 13% and/or especially less than 15%.

The lime, CaO, content of the selected compositions is between 17 and 25%, especially greater than 18%, or even greater than 20%, and/or especially less than 24%.

The magnesia, MgO, content of the selected compositions is between 0 and 5%, especially greater than 0.1%, and even greater than 0.5%, or indeed greater than 1%, and/or less than 4%.

The limits defined in terms of alkaline-earth metal oxides, lime and magnesia make it possible to adjust the viscosity and control the devitrification of the glasses according to the invention. The ability to be correctly fiberized is obtained by choosing the sum of these alkaline-earth metal oxides to be between 21 and 28%: this is because it has been found that the devitrification phenomena are accentuated in unacceptable proportions above 28% and that the viscosity of the glasses generally becomes too high when the alkaline-earth metal content is less than 21%.

Alkalis, especially sodium hydroxide $Na_2O$ and potassium hydroxide $K_2O$, may be introduced into the compositions of the glass yarns according to the invention in order to further limit devitrification and possibly reduce the viscosity of the glass. However, the content of alkali metal oxides $Na_2O+K_2O+Li_2O$ must remain less than or equal to 2% in order to prevent an unacceptable increase in the electrical conductivity for applications in the electronics field and to prevent an adverse reduction in the hydrolytic resistance of the glass. The alkali content is generally greater than 0.1%, due to the presence of impurities contained in the batch materials carrying other constituents. The composition may contain a single alkali metal oxide (taken from $Na_2O$, $K_2O$ and $Li_2O$) or may contain a combination of at least two alkali metal oxides.

According to one embodiment of the invention, the alkali content is essentially obtained using sodium hydroxide $Na_2O$.

The amount of boron is less than or equal to 3%. This is because it is desirable to limit this oxide to low contents since the cost of the boron-bearing batch materials is high. In one embodiment of the invention, the boron content may advantageously be less than or equal to 0.5%. Boron may be introduced in a moderate amount by incorporating, as batch material, boron-containing glass yarn waste, for example E-glass yarn waste. This embodiment corresponds especially to compositions whose boron content is between 0.5 and 3%.

Fluorine, $F_2$, may be added in a small amount to improve the melting of the glass, or it may be present as an impurity.

The optional $TiO_2$ and/or $Fe_2O_3$ contents are to be considered rather as contents of impurities, often encountered in this family of compositions.

In the rest of the text, any percentage of a constituent of the composition should be understood to be a percentage by weight, and the compositions according to the invention may include up to 2 or 3% of compounds to be regarded as non-analysed impurities, as is known in this kind of composition.

Within the framework of the limits defined above, it has been established that compositions satisfying the sum of the network formers $SiO_2+Al_2O_3$ lying between 70 and 73%, especially less than or equal to 72%, exhibit a particularly useful range for the fiberizing conditions. This is because it is known that $SiO_2+Al_2O_3$ are network-forming oxides in the glasses, oxides which allow the viscosity of the glasses to be adjusted. Compositions containing less than 70% $SiO_2+Al_2O_3$ are too fluid to allow a satisfactory fiberizing range (defined as the difference between the temperature corresponding to a glass viscosity of $10^{2.5}$ poise (decipascal second) (denoted $T_{log\,2.5}$) and the liquidus temperature (denoted $T_{liquidus}$)). The compositions which contain more than 73% $SiO_2+Al_2O_3$ are too viscous to be fiberized under satisfactory conditions and have high liquidus temperatures and devitrify easily during fiberizing.

A surprising effect has been observed in compositions having a ratio $R1=Al_2O_3/CaO$ of less than 0.7. This is because the compositions according to the invention exhibit appreciably more moderate devitrification than compositions in neighbouring ranges. It is thus possible to obtain compositions whose liquidus temperatures $T_{liquidus}$ is less than or equal to 1200° C.

One particularly advantageous criterion is used in particular to select compositions whose viscosities are suitable for the fiberizing conditions, especially with a fiberizing range greater than 100° C., while obtaining reasonably low conditioning temperatures, especially with the temperature corresponding to a viscosity of $10^{2.5}$ poise of less than 1330° C. This criterion, based on the ratio R2, may be expressed as: $2.35<R2<2.70$.

It has proved the case that this selection makes it possible to obtain, by virtue of a judicious compromise between the effect of the various oxides, wide fiberizing ranges, especially of greater than 100° C. and even greater than 120° C. The glasses according to the invention may thus be fiberized with a satisfactory efficiency under industrial operating conditions.

Furthermore, these glasses have a viscosity of $10^{2.5}$ poise (i.e. approximately 316 poise) at a temperature between 1300 and 1330° C., especially less than or equal to 1320° C., and a viscosity of $10^3$ poise at a temperature between 12200 and 1250° C., especially less than or equal to 1240° C., thereby allowing them to be transported in the furnace feeders without significant expenditure of energy and allowing them to be used in conventional E-glass fiberizing plants. Consequently, and because of the reduced cost of the compositions according to the invention, the overall cost of producing the yarns according to the invention is advantageously reduced compared with the usual cost of producing E-glass yarns.

The respective $F_2$ and $Li_2O$ contents also remain advantageously below 1% in order to avoid glass opacification defects, major problems in smoke treatment and the problems mentioned above associated with the high alkali metal oxide contents, this limitation also making it possible to obtain the desired particularly inexpensive and easily processable glasses according to the invention.

Likewise, the limiting contents of boron oxide $B_2O_3$ (less than 3%) make it possible to reduce the cost of the smoke treatment compared with that of conventional E-glasses.

The yarns according to the invention may thus be produced and processed like E-glass yarns and are furthermore much less expensive.

The glass yarns according to the invention are obtained from the glasses of the composition described above, using the following process: a multiplicity of molten glass streams, flowing out of a multiplicity of orifices arranged at the base of one or more spinnerets, is drawn into the form of one or more sheets of continuous filaments and the filaments are then assembled into one or more yarns which are collected on a moving support. This may be a rotating support when the yarns are collected in the form of wound packages or a support moving translationally when the yarns are chopped by a member also serving to draw them or when the yarns are sprayed by a member serving to draw them so as to form a mat.

The yarns obtained, possibly after further conversion operations, may thus be in various forms: continuous yarns, chopped yarns, braids, tapes, mats, networks, fabrics (or other structures in which the filaments constituting the yarns are separate and dispersed), etc., these yarns being composed of filaments with a diameter possibly ranging from 5 to 24 microns approximately.

The molten glass feeding the spinnerets is generally obtained from materials (or products or components or materials) which are possibly pure (coming, for example, from the chemical industry) but which are usually natural, the latter sometimes including trace impurities, these batch materials (pure or natural) being mixed in suitable proportions in order to obtain the desired composition and then being melted. The temperature of the molten glass (and therefore its viscosity) is conventionally adjusted by the operator so as to allow the glass to be fiberized while especially avoiding the problems of devitrification and so as to obtain the highest possible quality of glass yarns. Before they are assembled in the form of yarns, the filaments are generally coated with a sizing composition (conventionally chosen depending, in particular, on the application of the yarns) allowing them to be protected from abrasion and making it easier to be subsequently combined with materials to be reinforced.

According to one particularly advantage process for manufacturing the yarns according to the invention, at least some of the batch materials used for producing the molten glass is glass yarn waste, preferably reinforcing glass yarn waste, for example glass yarn waste as defined according to the invention and/or E-glass yarn waste. In the latter case, this is, for example, yarn waste having the following composition, expressed in percentages by weight: $SiO_2$: 52-57%; $Al_2O_3$: 12-16%; CaO: 16-25%; MgO: 0-6%; $B_2O_3$: 5-13%, alkali metal oxides (essentially $Na_2O$ and/or $K_2O$): 0-2% (this composition possibly also including one or more other components in proportions not exceeding 1.5% for each other component), the yarns of this composition being in practice regarded as being E-glass yarns. Particularly surprisingly, the glass yarn waste, such as E-glass yarn waste, which poses recycling difficulties in the manufacture of E-glass yarns, is perfectly reusable here in the manufacture of glass yarns according to the invention. The waste can be reintroduced without any difficulty into the charge of batch materials used for producing the molten glass, the proportions of the other batch materials used (generally natural and/or pure batch materials) being readjusted in order to obtain the composition as defined according to the invention. In the same way, yarn waste as defined according to the invention and/or other reinforcing glass yarn waste may be used. The glass yarn waste generally comes from unreeled waste or scrap (or not covered on translationally moving supports) recovered beneath the spinnerets for manufacturing the glass yarns, but it can also come from waste or scrap from the finishing of the products obtained (chopped edges of mats, ends of packages, etc.), this waste or scrap optionally being treated (for example heat treated) so as to remove, where appropriate, the sizing covering them and being ground so as to have, where appropriate, a particle size comparable to that of the other batch materials used for producing the yarns according to the invention.

Preferably, the amount of glass yarn waste present in the charge of batch materials which is melted to obtain the molten glass of the composition according to the invention represents from 0 to 35% by weight of the charge, particularly preferably it is between 0 and 25% by weight of the charge and particularly advantageously it consists of 5 to 20% by weight of the charge. The process using the glass yarn waste is particularly inexpensive and makes it possible to obtain even more advantageously manufacturing costs according to the invention.

The composites obtained from the yarns according to the invention comprise at least one organic material and/or at least one inorganic material and comprise glass yarns, at least some of the yarns being the glass yarns according to the invention.

Optionally, the glass yarns according to the invention may have already been combined, for example during drawing, with filaments of organic material so as to obtain composite yarns. By extension "glass yarns whose composition comprises . . . " is understood according to the invention to mean "yarns formed from glass filaments whose composition comprises . . . ", the glass filaments possibly being combined with organic filaments before the filaments are assembled into yarns.

The advantages presented by glass yarns according to the invention will be better appreciated through the following examples denoted Ex. 1 to Ex. 10, given in Table I, illustrating the present invention without however limiting it.

Comparative examples, denoted A, B, C, D, E, are given in Table II.

In these examples, glass yarns composed of 14 μm diameter glass filaments are obtained by drawing molten glass, the glass having the composition mentioned in Table I, expressed in percentages by weight.

When the sum of all the contents of all the components is slightly less than or greater than 100%, it should be understood that the residual content corresponds to the impurities and minor components not analysed, an amount of at most 1 to 2% and/or is only due to the accepted approximation in this field in the analytic methods used.

R1 denotes the ratio: $Al_2O_3/CaO$.

R2 denotes the ratio: $(SiO_2+Al_2O_3)/(RO+R_2O+B_2O_3)$.

T(log 2.5) denotes the temperature at which the viscosity of the glass is $10^{2.5}$ poise (decipascal second).

T(log 3) denotes the temperature at which the viscosity of the glass is $10^3$ poise (decipascal second).

$T_{liquidus}$ denotes the liquidus temperature of the glass corresponding to the temperature at which the most refractory phase, which can devitrify in the glass, has a zero growth rate and thus corresponds to the melting point of this devitrified phase.

The term "fiberizing range" refers to the difference between the temperatures, namely $T(\log 2.5) - T_{liquidus}$.

All the compositions according to the invention (Ex. 1 to Ex. 10) have a fiberizing range greater than 100° C., or greater than 110° C., and even greater than 120° C.

The compositions according to the invention have a viscosity compatible with the fiberizing process, especially with a temperature $T(\log 2.5)$ of less than or equal to 1330° C., and even especially less than 1320° C.

The compositions according to the invention have liquidus temperatures, $T_{liquidus}$, compatible with the fiberizing process, especially less than or equal to 1200° C.

The compositions according to the invention have a ratio R1 of less than 0.7.

The compositions according to the invention have a ratio R2, the sum of network formers divided by the sum of modifiers, of between 2.35 and 2.7.

The comparative examples A to E are used to illustrate the advantages of the selected region according to the invention.

Example A, specifically, illustrates the case of silica contents higher than according to the invention, with an $SiO_2 + Al_2O_3$ sum>73%, and the ratio R2 is high, greater than 2.8. With this glass, a good fiberizing range is obtained, but with a temperature $T(\log 2.5)$ greater than 1350° C., which results in additional costs for conditioning the glass.

Example B illustrates the case of a composition low in silica, with $SiO_2 + Al_2O_3 < 70\%$. The ratio R2 is low, less than 2.35.

A temperature $T(\log 2.5)$ is then obtained which is advantageous for conditioning the glass but the fiberizing range, less than 100° C., is insufficient to obtain a good fiberizing efficiency.

Example C illustrates the case of a composition having a low alumina content, with $SiO_2 + Al_2O_3 < 70\%$. The same conclusions as for Example B are observed.

Example D illustrates the case in which $SiO_2 + Al_2O_3$ lies within the desired range, but the ratio R1 is greater than or equal to 0.7. In this case, a high liquidus temperature, of 1240° C., is observed. This temperature results in an insufficient fiberizing range, of less than 100° C. It is apparent that, in order to maintain liquidus temperatures less than or equal to 1200° C., it is desirable for the criterion R1<0.7 to be met.

Example E illustrates the case of a high silica content (53%) with a boron content of less than 2%. The ratio R2 is greater than 2.7. In this case, the temperature $T(\log 2.5)$ reaches 1350° C., this being too high for the applications intended in the invention.

Advantageously, the glass yarns according to the invention are suitable for all the usual applications of conventional E-glass yarns.

TABLE I

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ | 56.5 | 55 | 58 | 58 | 58 | 57.5 | 57 | 56.8 | 56.5 | 56.5 |
| $Al_2O_3$ | 15 | 15 | 14 | 14 | 14 | 14 | 15 | 15 | 15 | 15 |
| $SiO_2 + Al_2O_3$ | 71.5 | 70 | 72 | 72 | 72 | 71.5 | 72 | 71.8 | 71.5 | 71.5 |
| CaO | 23 | 24 | 21.5 | 21.5 | 22.5 | 23.5 | 22 | 22.5 | 23 | 24 |
| MgO | 2 | 3 | 1.5 | 3 | 2 | 1.5 | 3 | 4 | 2.5 | 2.5 |
| RO = CaO + MgO | 25 | 27 | 23 | 24.5 | 24.5 | 25 | 25 | 26.5 | 26.5 | 26.5 |
| $R_2O = Na_2O + K_2O + Li_2O$ | 1 | 1 | 2 | 1 | 1 | 1 | 1 | 1 | 0.1 | 0.1 |
| $B_2O_3$ | 2 | 1.5 | 3 | 2.5 | 2.5 | 2.5 | 2 | 0.5 | 2.8 | 2 |
| R1 = $Al_2O_3$/CaO | 0.65 | 0.63 | 0.65 | 0.65 | 0.62 | 0.6 | 0.68 | 0.67 | 0.65 | 0.63 |
| R2 = $SiO_2 + Al_2O_3$/(RO + $R_2O$ + $B_2O_3$) | 2.55 | 2.37 | 2.57 | 2.67 | 2.57 | 2.50 | 2.57 | 2.56 | 2.42 | 2.5 |
| T (log 2.5) (° C.) | 1315 | 1300 | 1320 | 1320 | 1325 | 1315 | 1320 | 1315 | 1320 | 1320 |
| T (log 3) (° C.) | 1235 | 1220 | 1235 | 1240 | 1240 | 1235 | 1240 | 1240 | 1240 | 1240 |
| $T_{liquidus}$ (° C.) | 1180 | 1200 | ≦1200 | ≦1200 | ≦1200 | ≦1200 | ≦1200 | ≦1200 | ≦1200 | ≦1200 |
| Fiberizing range (° C.) | 135 | 100 | ≧120 | ≧120 | ≧125 | ≧115 | ≧120 | ≧115 | ≧120 | ≧120 |

TABLE II

|  | A | B | C | D | E |
|---|---|---|---|---|---|
| $SiO_2$ | 60.8 | 54 | 57 | 56 | 58 |
| $Al_2O_3$ | 12.7 | 15 | 12 | 16 | 15 |
| $SiO_2 + Al_2O_3$ | 73.5 | 69 | 69 | 72 | 73 |
| CaO | 21.5 | 23 | 23.5 | 22.3 | 22 |
| MgO | 3.2 | 3.5 | 3.5 | 3 | 1.5 |
| RO = CaO + MgO | 24.7 | 26.5 | 27 | 25.3 | 23.5 |
| $R_2O = Na_2O + K_2O + Li_2O$ | 0.55 | 1.5 | 1 | 0.7 | 1.5 |
| $B_2O_3$ | 0.5 | 2.5 | 2 | 1 | 1.5 |
| R1 = $Al_2O_3$/CaO | 0.59 | 0.65 | 0.5 | 0.72 | 0.68 |
| R2 = $SiO_2 + Al_2O_3$/(RO + $R_2O$ + $B_2O_3$) | 2.85 | 2.26 | 2.3 | 2.6 | 2.75 |
| T (log 2.5) (° C.) | 1380 | 1275 | 1270 | 1330 | 1350 |
| T (log 3) (° C.) | 1290 | 1200 | 1195 | 1250 | 1265 |
| $T_{liquidus}$ (° C.) | 1200 | 1190 | 1190 | 1240 | 1190 |
| Fiberizing range (° C.) | 180 | 85 | 80 | 90 | 160 |

The invention claimed is:

1. Reinforcing glass yarn, the composition of which comprises the following constituents, within the limits defined below, expressed in percentages by weight:

| | |
|---|---|
| $SiO_2$ | 54.5 to 58% |
| $Al_2O_3$ | 12 to 15.5% |
| $SiO_2 + Al_2O_3$ | 70 to 73% |
| CaO | 17 to 25% |
| MgO | 0 to 5% |
| RO = CaO + MgO | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1% | and such that the ratio $R1=Al_2O_3/CaO$ is less than 0.7, and when $SiO_2$ is greater than 57% the amount of boron oxide $B_2O_3$ is greater than 2%,
wherein the composition further satisfies the criterion:
$2.35<R2=(SiO_2+Al_2O_3)/(RO+R_2O+B_2O_3)<2.70$,
a T (log 2.5) of at least 1300° C.,
its liquidus temperature is less than or equal to 1200° C.,
and its fiberizing temperature range is greater than 100° C.

2. Glass yarn according to claim 1, wherein the composition has a silica, $SiO_2$, content such that $SiO_2 \leq 57\%$.

3. Glass yarn according to claim 1, wherein the composition has a boron oxide, $B_2O_3$, content such that:

$B_2O_3 \leq 0.5\%$.

4. Glass yarn according to claim 1, wherein the composition has a boron oxide, $B_2O_3$, content such that:

$0.5\% \leq B_2O_3 \leq 3\%$.

5. Glass yarn according to claim 1, wherein $SiO_2+Al_2O_3$ is 72%.

6. Glass yarn according to claim 1, wherein $SiO_2+Al_2O_3$ is less than 72%.

7. Glass yarn according to claim 1, wherein, expressed in percentages by weight:

| | |
|---|---|
| $SiO_2$ | 56.5% |
| $Al_2O_3$ | 15% |
| $SiO_2 + Al_2O_3$ | 71.5% |
| CaO | 23% |
| MgO | 2% |
| RO | 25% |
| $R_2O$ | 1% |
| $B_2O_3$ | 2% |
| R1 | 0.65% |
| R2 | 2.55%. |

8. Glass yarn according to claim 1, wherein, expressed in percentages by weight:

| | |
|---|---|
| $SiO_2$ | 55% |
| $Al_2O_3$ | 15% |
| $SiO_2 + Al_2O_3$ | 70% |
| CaO | 24% |
| MgO | 3% |
| RO | 27% |
| $R_2O$ | 1% |
| $B_2O_3$ | 1.5% |
| R1 | 0.63% |
| R2 | 2.37%. |

9. Glass yarn according to claim 1, wherein, expressed in percentages by weight:

| | |
|---|---|
| $SiO_2$ | 58% |
| $Al_2O_3$ | 14% |
| $SiO_2 + Al_2O_3$ | 72% |
| CaO | 21.5% |
| MgO | 1.5% |
| RO | 23% |
| $R_2O$ | 2% |
| $B_2O_3$ | 3% |
| R1 | 0.65% |
| R2 | 2.57%. |

10. Glass yarn according to claim 1, wherein, expressed in percentages by weight:

| | |
|---|---|
| $SiO_2$ | 58% |
| $Al_2O_3$ | 14% |
| $SiO_2 + Al_2O_3$ | 72% |
| CaO | 21.5% |
| MgO | 3% |
| RO | 24.5% |
| $R_2O$ | 1% |
| $B_2O_3$ | 2.5% |
| R1 | 0.65% |
| R2 | 2.67%. |

11. Glass yarn according to claim 1, wherein, expressed in percentages by weight:

| | |
|---|---|
| $SiO_2$ | 58% |
| $Al_2O_3$ | 14% |
| $SiO_2 + Al_2O_3$ | 72% |
| CaO | 22.5% |
| MgO | 2% |
| RO | 24.5% |
| $R_2O$ | 1% |
| $B_2O_3$ | 2.5% |
| R1 | 0.62% |
| R2 | 2.57%. |

12. Glass yarn according to claim 1, wherein, expressed in percentages by weight:

| | |
|---|---|
| $SiO_2$ | 57.5% |
| $Al_2O_3$ | 14% |
| $SiO_2 + Al_2O_3$ | 71.5% |
| CaO | 23.5% |
| MgO | 1.5% |
| RO | 25% |
| $R_2O$ | 1% |
| $B_2O_3$ | 2.5% |
| R1 | 0.6% |
| R2 | 2.50%. |

13. Glass yarn according to claim 1, wherein, expressed in percentages by weight:

| | |
|---|---|
| $SiO_2$ | 57% |
| $Al_2O_3$ | 15% |
| $SiO_2 + Al_2O_3$ | 72% |
| CaO | 22% |
| MgO | 3% |
| RO | 25% |
| $R_2O$ | 1% |
| $B_2O_3$ | 2% |
| R1 | 0.68% |
| R2 | 2.57%. |

14. Glass yarn according to claim 1, wherein, expressed in percentages by weight:

| | |
|---|---|
| $SiO_2$ | 56.8% |
| $Al_2O_3$ | 15% |
| $SiO_2 + Al_2O_3$ | 71.8% |
| CaO | 22.5% |
| MgO | 4% |
| RO | 26.5% |
| $R_2O$ | 1% |
| $B_2O_3$ | 0.5% |
| R1 | 0.67% |
| R2 | 2.56%. |

15. Glass yarn according to claim 1, wherein, expressed in percentages by weight:

| | |
|---|---|
| $SiO_2$ | 56.5% |
| $Al_2O_3$ | 15% |
| $SiO_2 + Al_2O_3$ | 71.5% |
| CaO | 23% |
| MgO | 2.5% |
| RO | 26.5% |
| $R_2O$ | 0.1% |
| $B_2O_3$ | 2.8% |
| R1 | 0.65% |
| R2 | 2.42%. |

16. Glass yarn according to claim 1, wherein, expressed in percentages by weight:

| | |
|---|---|
| $SiO_2$ | 56.5% |
| $Al_2O_3$ | 15% |
| $SiO_2 + Al_2O_3$ | 71.5% |
| CaO | 24% |
| MgO | 2.5% |
| RO | 26.5% |
| $R_2O$ | 0.1% |
| $B_2O_3$ | 2% |
| R1 | 0.63% |
| R2 | 2.5%. |

17. Composite consisting of glass yarns and of organic and/or inorganic material(s), wherein said composite comprises glass yarns as defined by claim 1.

18. Process for manufacturing glass yarns as defined in claim 1, in which a multiplicity of molten glass streams, flowing out of a multiplicity of orifices arranged at the base of one or more spinnerets, is drawn into the form of one or more sheets of continuous filaments and the filaments are then assembled into one or more yarns which are collected on a moving support.

19. Process according to claim 18, wherein the molten glass feeding the orifices of the spinneret(s) has the following composition, expressed in percentages by weight:

| | |
|---|---|
| $SiO_2$ | 54.5 to 58% |
| $Al_2O_3$ | 12 to 15.5% |
| $SiO_2 + Al_2O_3$ | 70 to 73% |
| CaO | 17 to 25% |
| MgO | 0 to 5% |
| $RO = CaO + MgO$ | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1% | and such that the ratio $R1=Al_2O_3/CaO$ is less than 0.7, and when $SiO_2$ is greater than 57% the amount of boron oxide $B_2O_3$ is greater than 2%,
wherein the composition further satisfies the criterion:
$2.35<R2=(SiO_2+Al_2O_3)/(RO+R_2O+B_2O_3)<2.70$,
a T (log 2.5) of at least 1300° C., its liquidus temperature is less than or equal to 1200° C., and
and its fiberizing temperature range is greater than 100° C.

20. Process according to claim 18, wherein the molten glass is obtained from batch materials mixed in suitable proportions, at least some of the said batch materials being glass yarn waste.

21. Process according to claim 20, wherein the waste is E-glass yarn waste and/or waste from glass yarns comprising:

| | |
|---|---|
| $SiO_2$ | 54.5 to 58% |
| $Al_2O_3$ | 12 to 15.5% |
| $SiO_2 + Al_2O_3$ | 70 to 73% |
| CaO | 17 to 25% |
| MgO | 0 to 5% |
| $RO = CaO + MgO$ | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1%. |

22. Process according to claim 20, wherein the waste represents up to 35% by weight of the batch materials.

23. The process according to claim 20, wherein the glass yarn waste is 5 to 20% by weight.

24. Glass composition suitable for producing reinforcing glass yarns comprising the following constituents, within the limits defined below, expressed in percentages by weight:

| | |
|---|---|
| $SiO_2$ | 54.5 to 58% |
| $Al_2O_3$ | 12 to 15.5% |
| $SiO_2 + Al_2O_3$ | 70 to 73% |
| CaO | 17 to 25% |
| MgO | 0 to 5% |
| $RO = CaO + MgO$ | 21 to 28% |
| $R_2O = Na_2O + K_2O + Li_2O$ | up to 2% |
| $TiO_2$ | less than 1% |
| $Fe_2O_3$ | less than 0.5% |
| $B_2O_3$ | up to 3% |
| $F_2$ | less than 1%. | wherein the composition further satisfies the criterion:
$2.35<R2=(SiO_2+Al_2O_3)/(RO+R_2O+B_2O_3)<2.70$,
a T (log 2.5) of at least 1300° C.,
its liquidus temperature is less than or equal to 1200° C., and
its fiberizing temperature range is greater than 100° C.

* * * * *